Figure 1:
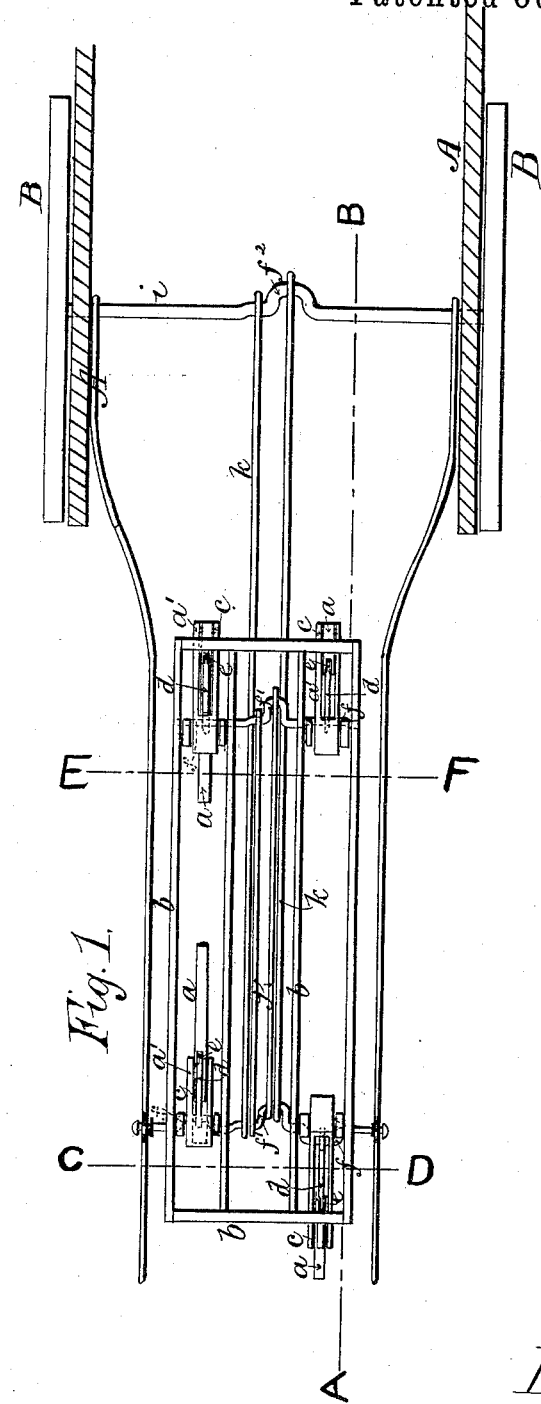

(No Model.) 6 Sheets—Sheet 1.

W. H. HALL.
MECHANICAL TOY ANIMAL FIGURE.

No. 328,912. Patented Oct. 20, 1885.

Witnesses
Percy White
Guy L. DeMotte

Inventor
Wm Hamilton Hall
by John J. Halsted & Son
his Atty.

(No Model.) 6 Sheets—Sheet 2.
W. H. HALL.
MECHANICAL TOY ANIMAL FIGURE.
No. 328,912. Patented Oct. 20, 1885.
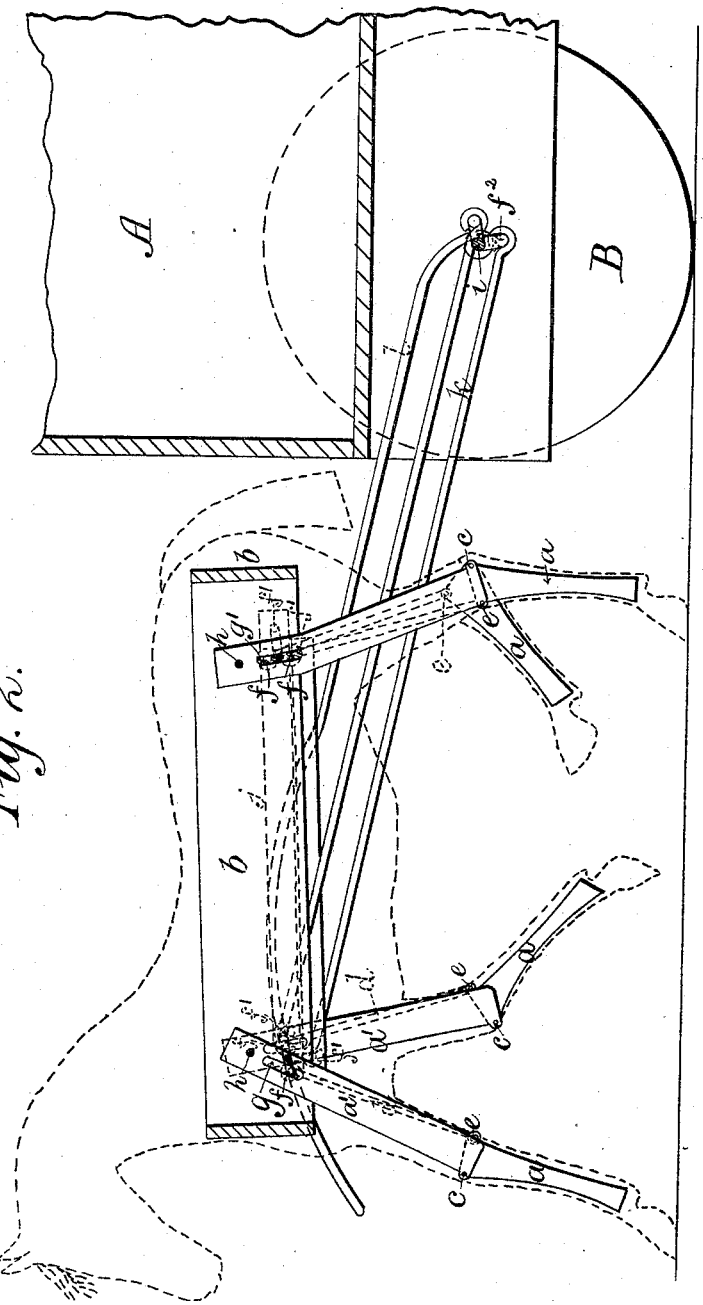

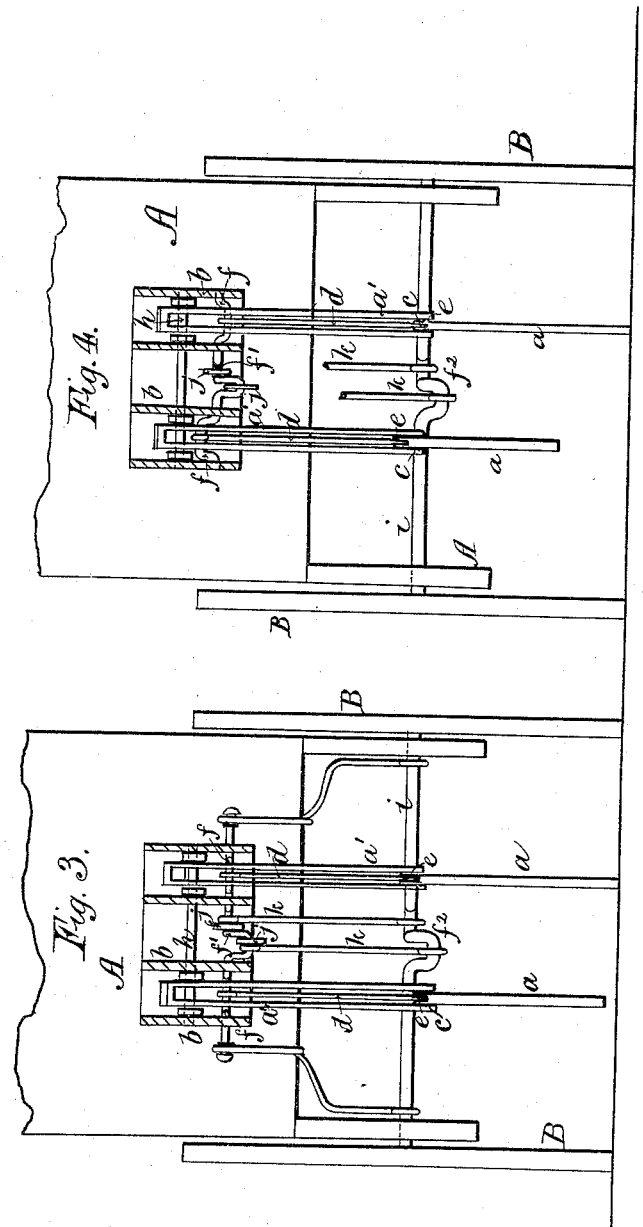

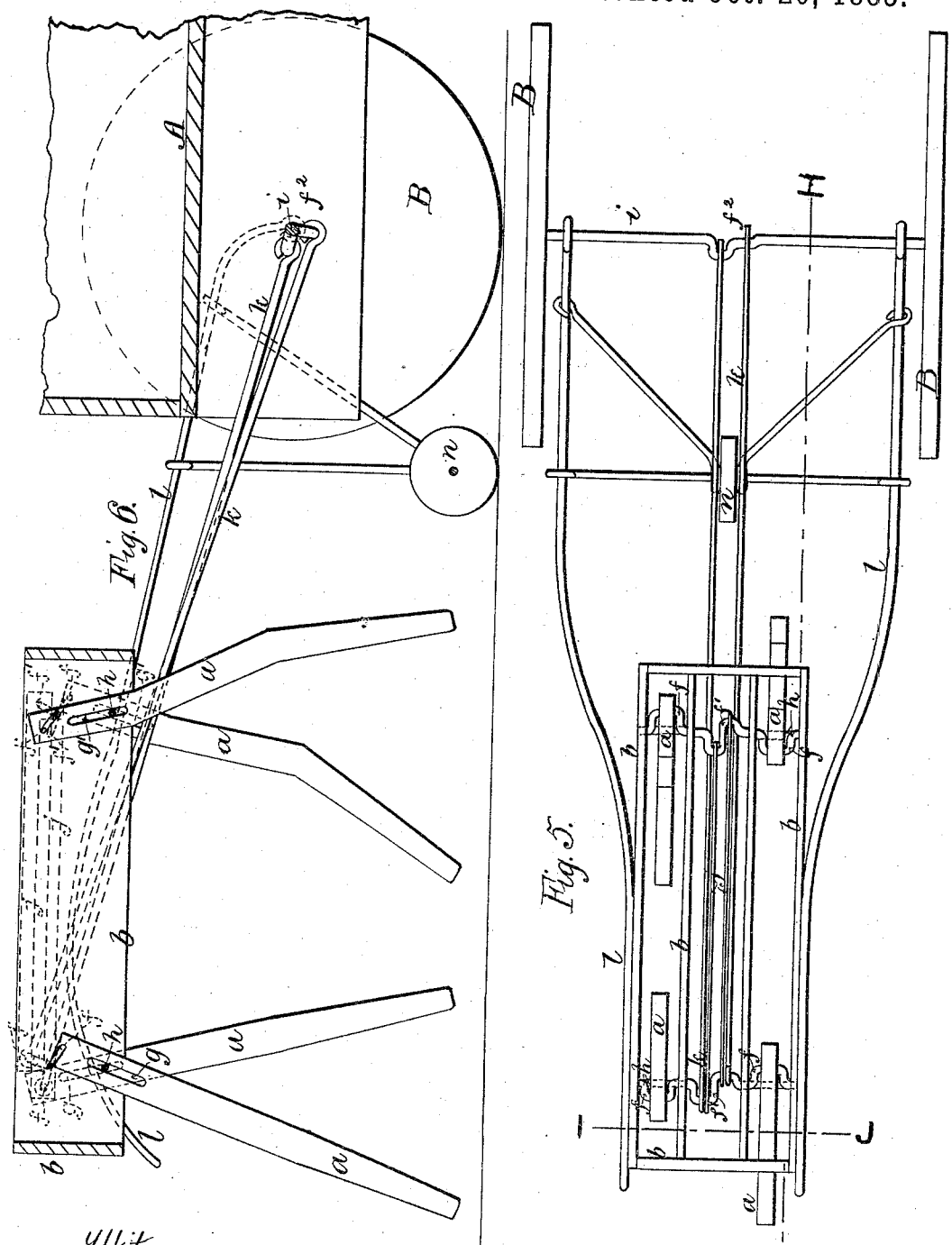

(No Model.) 6 Sheets—Sheet 5.

W. H. HALL.
MECHANICAL TOY ANIMAL FIGURE.

No. 328,912. Patented Oct. 20, 1885.

Witnesses
Percy White
Guy L. DeMotte

Inventor
Wm Hamilton Hall
by John J. Halsted & Son
his Attys.

(No Model.) 6 Sheets—Sheet 6.

W. H. HALL.
MECHANICAL TOY ANIMAL FIGURE.

No. 328,912. Patented Oct. 20, 1885.

Witnesses
Percy White
Guy L. DeMotte

Inventor
Wm Hamilton Hall
by John J. Halsted & Son
his Attys

United States Patent Office.

WILLIAM HAMILTON HALL, OF WEST BRIGHTON, COUNTY OF SUSSEX, ENGLAND.

MECHANICAL TOY ANIMAL FIGURE.

SPECIFICATION forming part of Letters Patent No. 328,912, dated October 20, 1885.

Application filed July 15, 1884. Serial No. 137,793. (No model.) Patented in England April 17, 1884, No. 6,470; in Germany July 1, 1884, No. 29,806; in France July 4, 1884, No. 163,149; in Austria-Hungary December 4, 1884, No. 34,162 and No. 56,714, and in Belgium March 28, 1885, No. 68,347.

*To all whom it may concern:*

Be it known that I, WILLIAM HAMILTON HALL, a subject of the Queen of Great Britain, residing at West Brighton, in the county of Sussex, England, have invented new and useful Improvements in Mechanical Toy Animal Figures, of which the following is a specification.

Toy animal figures moving by mechanical means are at present as a rule expensive to manufacture, owing to their method of construction, and are also more or less imperfect in their movements; and the objects of this invention are to provide a cheaper method of construction, as well as a means for making the movements of the said animal figures more perfect and natural.

Now, the said invention consists of the embodiment of the following principles and details of construction: Take, for the purpose of description the figure of a horse which it is required shall mechanically walk along, bending the knees of the fore legs and lifting the lower portions of the hind legs at the hock-joints as they respectively move or step forward in a natural manner. The legs are actuated at their upper extremities and the body of the horse is hollow to receive the mechanism actuating the same. The legs are jointed about midway between their junction with the body and the feet, and the lower portions of the legs below the said joints may be raised and lowered by means of rods (hereinafter called "joint-rods,") connected with some convenient part of the said lower portions, respectively, which joint-rods passing upward through the upper portions of the legs (hollowed to allow of the same) are then connected with and actuated by cranked axles. The said cranked axles are two in number, (one for the fore legs and one for the hind legs,) and pass transversely through the body, and may be of bent wire. The wires or crank-pins which hold the said joint-rods also pass through slots in the upper portions of the legs, so that each crank when actuated, not only works the whole leg it serves backward and forward by means of the slot, but simultaneously lifts and lowers the lower portion of it by means of the joint-rod. The legs are hung or supported upon wire pins passing through their upper extremities and fixed transversely across the body above the said crank-axles. The positions of the cranks actuating the legs, as aforesaid, in relation one to another are arranged so that the feet strike the ground alternately in a manner natural to the walking pace of a horse. The axle-tree or one of the axle-trees (if more than one) of the said carriage or vehicle is doubly cranked, there being a difference of ninety degrees in the relative positions of the two cranks—that is to say, one crank is at right angles with the other—and the said cranked axles actuating the legs are further doubly cranked in a corresponding manner, and are then connected at such cranks by two connecting-rods, one of the said cranked axles (the one actuating the fore legs by preference) being then in turn connected with the said cranked axle-tree by two connecting-rods in the same manner. The relative positions of the cranks actuating the legs, as aforesaid, may be so arranged and adjusted that the feet are timed to strike the ground in the order natural not only to the walking pace of an animal, but also to a trotting, galloping, or other pace.

Instead of the said cranked axles being below the said wire pins upon which the legs are hung or supported, as aforesaid, as is suitable to the case of a walking figure, the same may be placed above the said pins, which is suitable to the case of a fast-trotting figure or where the pace requires that the movement forward of the legs when the feet are lifted should be slower than the movement backward when the feet strike the ground; and in the case where the said cranked axles are placed above the said supporting-pins the same will require to be actuated in an opposite direction to the cranked axle-tree of the carriage or vehicle, attached as aforesaid. Where motive power is transmitted by such means, it is necessary, therefore, that each of the connecting-rods connecting one of the said cranked axles with the said cranked axle-tree, as aforesaid, should be so connected as to effect this object.

As a modification of the foregoing, the legs of the said animal figures may be without joints or joint-rods, and in that case they are actuated substantially in the same manner, with the difference that the said legs are hung or supported upon the wires or crank-pins of the cranks which work them, as aforesaid, and the said wire pins, hereinbefore referred to as "supporting-pins," pass through the slots in the upper portions of the legs so that each leg is worked backward and forward and simultaneously bodily lifted and lowered; and in the case where a horse or other animal figure has attached behind it a carriage or vehicle, the said carriage or vehicle may have attached to the shafts or other convenient part thereof, in a position intermediate of the wheels of the said carriage or vehicle and the said horse or animal figure, a small wheel or other support which, when the animal is moving, is alternately in contact with and lifted clear of the ground for the purpose of supporting the said horse or animal figure when it is not desirable that the feet or any of them shall be in contact with the ground.

The principle and means of construction comprised in the said invention may be applied as well to two-legged animal figures as to those having four legs, including human figures, and the actuating of the arms as well as the legs of such human figures.

In order to enable my invention to be fully understood, I will proceed to describe the same by reference to the accompanying drawings, in which—

Figure 7:
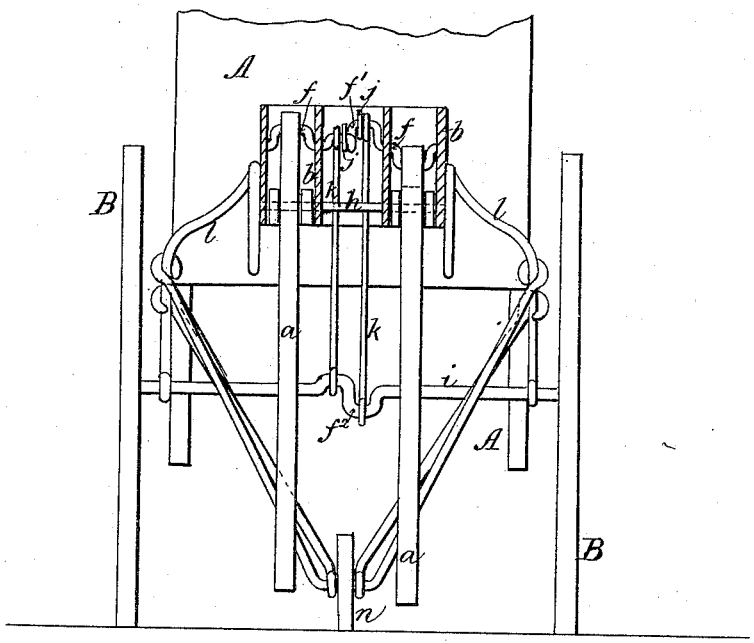
Figure 9:
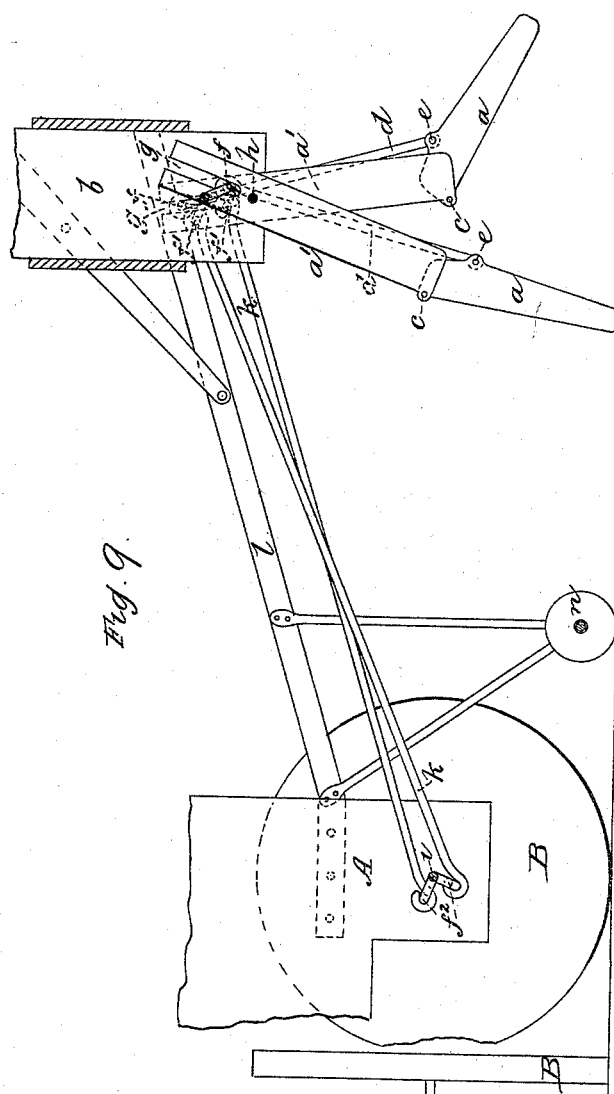
Figure 8:
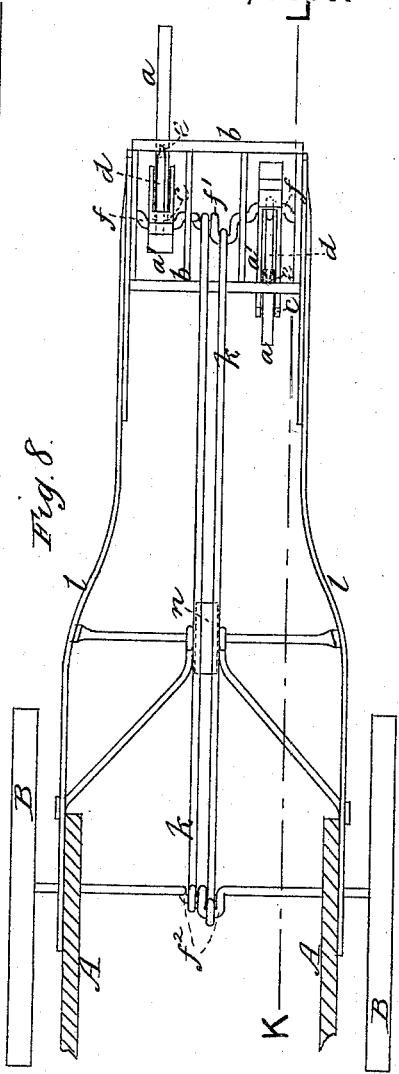
Figure 10:
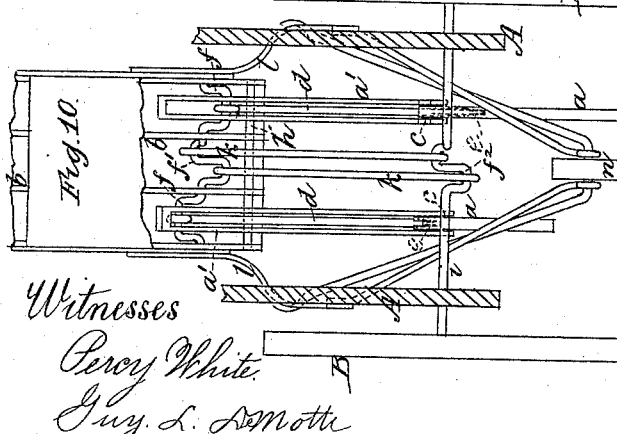

Figure 1 is a plan showing the mechanism of a toy horse constructed according to my invention and having jointed legs, the mechanism being arranged so that the toy shall imitate the movements of a horse when drawing a vehicle and moving at a walking pace. Fig. 2 is a longitudinal section on line A B of Fig. 1, and Figs. 3 and 4 are transverse vertical sections on the lines C D and E F, respectively, of Fig. 1. Fig. 5 is a plan showing the mechanism of a toy horse having legs without joints and arranged so that the toy shall imitate the movements of the animal when drawing a vehicle and moving at a supposed fast-trotting pace. Figs. 6 and 7 are a longitudinal section and a vertical transverse section on the lines G H and I J, respectively, of Fig. 5. Fig. 8 is a plan showing the mechanism of a toy man having jointed legs and arranged so that the toy shall imitate the movements of a man when pushing a hand-cart and when supposed to be moving at a running pace. Fig. 9 is a longitudinal section on the line K L of Fig. 8, and Fig. 10 is a front elevation of the same.

Similar letters in all the figures represent similar or corresponding parts.

I will first describe my invention by reference to Figs. 1 to 4.

$a$ and $a'$ represent the upper and lower parts, respectively, of the legs of the toy actuated at their upper extremities.

$b$ is a frame forming the body of the horse and serving to receive the mechanism actuating the legs.

$c\ c$ represent the joints of the legs, about midway between their junction with the body and the feet.

$d\ d$ are the joint-rods jointed at $e$ to the lower portions, $a$, of the legs, and serving to raise and lower the said portions of the legs. The joint-rods $d$ pass upward through the upper portions, $a'$, of the legs, as shown.

$f\ f'$ are the cranked axles, formed of bent wire, to which the said joint-rods $d$ are connected, the cranked axles $f\ f'$ passing transversely through the body and bearing in the frame $b$.

$g\ g'$ are the slots in the upper portions, $a'$, of the legs, through which slots pass the wires or cranks $f$, which hold the joint-rods $d$.

$h\ h$ are the pins on which the legs are hung or supported. The said pins pass through the upper extremities of the legs, and are fixed transversely across the body above the crank-axles $f\ f$. The positions of the cranks $f$ are arranged in relation to each other so that the feet shall strike the ground alternately in a manner natural to the walking pace of a horse. These relative positions are shown clearly in Figs. 3 and 4, which represent the mechanism operating the front and hind legs, respectively.

$i$ is the axle-tree of the carriage or vehicle A, from which the cranks $f\ f'$ are operated. The said axle-tree is doubly cranked at $f^2$, one of the cranks thereof being at an angle of ninety degrees or at right angles to the other, and the cranks $f'$ correspond therewith, as shown.

$j\ j$ are the connecting-rods connecting the cranks $f'$ with each other.

$k\ k$ are the connecting-rods connecting the cranks $f'$ of the fore legs with the cranks $f^2$ on the axle-tree $i$ of the carriage, as shown in Fig. 3.

$l$, Fig. 2, is a rod or wire, one of such rods or wires being pivoted on each side to the axle-tree $i$ of the carriage or vehicle A and to the extremities of the cranked axle of the fore legs of the mechanical figure, and which rods or wires $l$ form the shafts of the carriage or vehicle.

Motive power may be transmitted to the said cranked axles $f\ f'$, for the purpose of giving motion to the legs $a\ a'$ by means of clock-work in the interior of the body or by means of clock-work contained in some convenient part of the carriage or vehicle attached to the horse, the said clock-work in the latter case giving motion to the wheels B of such carriage or vehicle, and the said motion being transmitted to the said cranked axles $f\ f'$, actuating the legs $a\ a'$ by means of the connecting-rods, as hereinbefore described and shown. It will be understood that when the clock-work mechanism is contained with the body of the animal the connecting-rods $j$ and $k$ would be dispensed with; or motive power may be transmitted to the said cranked axles $ff'$, for the purpose of giving motion to the legs $a\ a'$, by the use of connecting-rods in connection with the cranked axle-tree $i$ of the carriage or vehicle A, attached, as aforesaid, alone, the construction being simply drawn or pushed along, or by other suitable means.

By this construction, if motive power be transmitted to the axle-tree $i$ in either of the before-mentioned ways the motion of the cranks $f^2$ will, by means of the connecting-rods $k$, be communicated to the crank $f$, actuating the fore legs of the figure, and the crank actuating the hind legs will receive a similar motion by means of the connecting-rods $jj$. As the cranks $f$ revolve in the slots $gg'$ of the legs, they will move the said legs backward and forward alternately, and at the same time lift and lower alternately the lower portions, $a$, of the legs by means of the joint-rods $d$, in such a manner that the feet of the figure shall strike the ground alternately in a manner natural to the walking pace of a horse.

The arrangement of the figure shown in Figs. 5 to 7 is similar to that hereinbefore described and shown in Figs. 1 to 4, with the exception that the cranks $ff'$ are placed above the supporting-pins $h$, which arrangement is suitable in cases where the feet of the figure are to be timed to strike the ground in the order natural to a fast-trotting horse or where the pace requires that the movement forward of the legs when the feet are lifted should be slower than the movement backward when the feet strike the ground. The cranks $ff'$ are for this purpose operated in an opposite direction to the cranks $f^2$ of the carriage or vehicle A by connecting the said cranks inversely, the connecting-rods $k$ crossing one another, as shown in Fig. 6, instead of working in a parallel manner, as in Fig. 2, the bearings of the said connecting-rods being allowed a little extra looseness or play at their connections with the crank-pins proportionate to the working diameter of the cranks and the length of the said connecting-rods. In the figures I am now describing I have shown the legs without joints and joint-rods, and in this case the legs $a$ are actuated substantially in the same manner as that hereinbefore described when referring to Figs. 1 to 4, with the exception that they are hung or supported upon the wires or crank-pins $f$, which operate them, and the pins $h$ pass through the slots $g\ g'$, so that each leg $a$ is moved backward and forward and simultaneously bodily lifted and lowered.

Where motive power is transmitted by means of connecting-rods in connection with a cranked axle-tree of a carriage or vehicle, as aforesaid, the diameter of the wheels of such carriage or vehicle should be in proportion to the pace of the animal figure—that is to say, the ground covered by one complete revolution of the said wheels must be about equal to the ground covered by one complete movement of the legs.

$n$ is a small wheel, which may be attached to the shafts $l$ of the carriage or vehicle intermediate of the wheels B thereof, which wheel $n$ serves to support the horse or other animal figure when it is not desirable that the feet or any of them shall be in contact with the ground.

Where the pace of any such animal figure as aforesaid is suited thereto, the soles of the feet may be serrated or roughened in any suitable way, and the legs actuated in conjunction with their contact with the ground.

In Figs. 8, 9, and 10 I have shown my invention as applied to a two-legged figure, the figure having jointed legs and pushing a hand-cart, and arranged to move at a running pace. The arrangement is substantially the same as those hereinbefore described, with the exception that only one set of cranks, $ff'$, is required, and the action of the figure will therefore be readily understood without further description.

Having thus particularly described and ascertained the nature of my said invention and in what manner the same is to be performed, I declare that what I claim is—

1. In a mechanical toy animal figure, as a means for actuating the limbs, the combination, with a cranked axle-tree, of connecting-rods $kk$, operated thereby, another crank-shaft connected by these rods to the cranks of said axle-tree and having other cranks playing in slots formed in the limbs of the figure, the cranks and rods being arranged to give alternate similar movements to the limbs, as in walking or running, as set forth.

2. In a mechanical toy animal figure, the combination of the cranked axle-tree $i$, connecting-rods $kk$, the slotted limbs of the figure, cranked shaft $ff'$, for operating said limbs, pivots $h$, and connecting-rods $j$, substantially as and for the purposes set forth.

3. In a mechanical toy figure, a cranked axle or axles, such as $ff'$, working in slots in the legs $a\ a'$, rods $d$, and supporting-pins $h$, in combination with connecting-rods $jk$ and cranked axle-tree $i$, as and for the purposes set forth.

WM. HAMILTON HALL.

Witnesses:
A. ALBUTT,
B. BRADY.